UNITED STATES PATENT OFFICE.

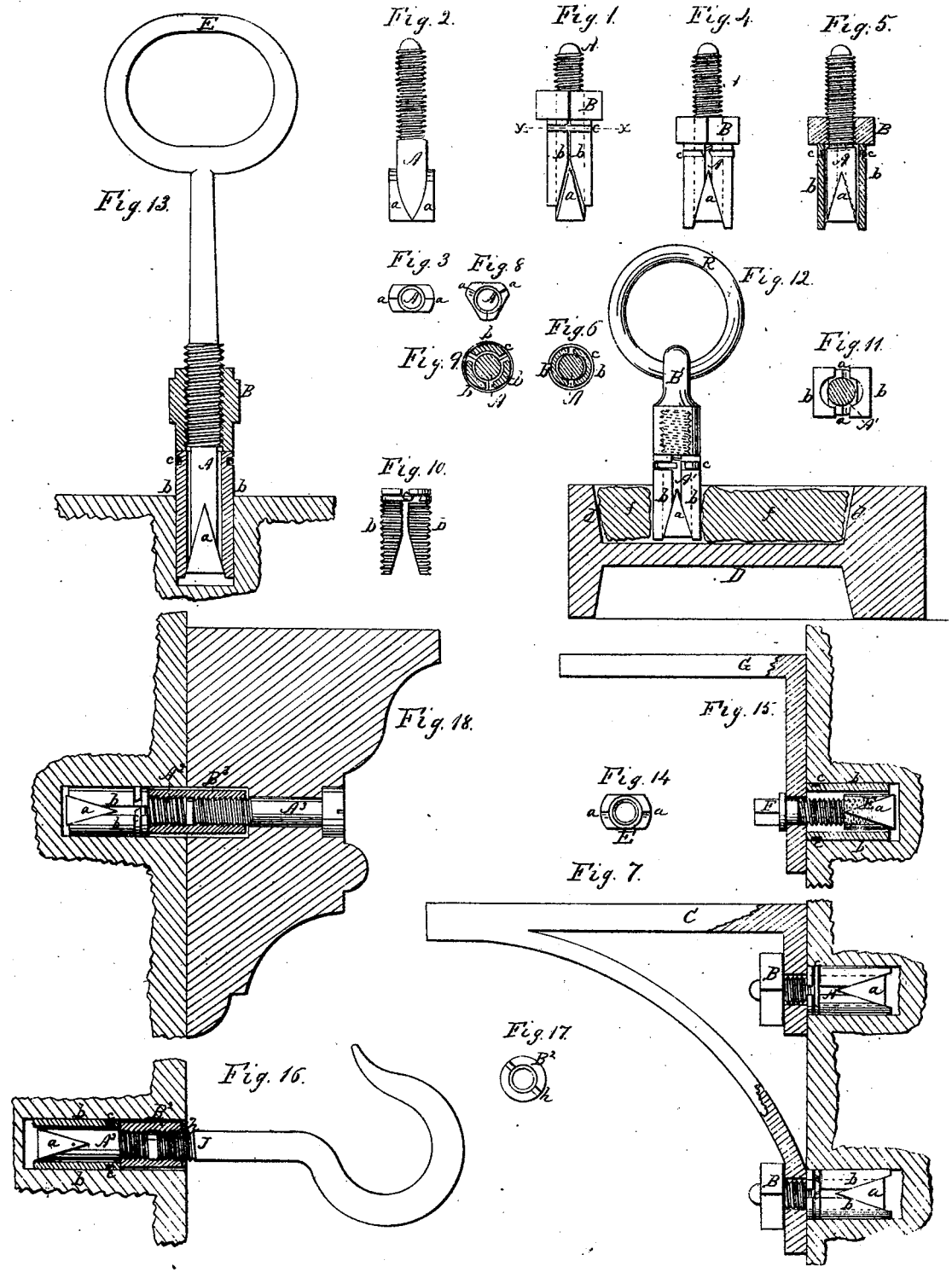

JOHN LOUDON AND OTTO AHLSTRÖM, OF NEW YORK, N. Y.

SCREW-FASTENING.

Specification of Letters Patent No. 13,177, dated July 3, 1855.

*To all whom it may concern:*

Be it known that we, JOHN LOUDON and OTTO AHLSTRÖM, of the city, county, and State of New York, have invented certain new and useful Improvements in Screw-Fastenings; and we do hereby declare that the following is a full, clear, and exact description of the same, reference being had to the accompanying drawings, forming part of this specification.

This invention relates to screw fastenings which are to be used under those conditions, in which a bolt and nut of the common kind are not conveniently applicable.

It consists in a certain method of constructing either a bolt head or a nut as the case may require whereby the screwing up of the nut or bolt as the case may be, causes the bolt head or nut to expand for the purpose of making it fit tightly within an opening in which it is received and prevent its drawing out.

Figures 1, 2, 3, 4, 5, 6, 7, in the drawing give the simplest illustrations of our invention, representing a bolt and nut with the bolt head made to expand, Fig. 7, showing the application of the bolt to secure an iron bracket to a piece of masonry.

Similar letters refer to like parts in these figures.

A, is the bolt which is made with two wedges *a*, one opposite the other to form a portion of the head. The form of these wedges is distinctly shown in Figs. 1, 2, and 3, Fig. 1, showing a longitudinal view of the bolt and nut complete. Fig. 2, a similar view of the bolt with the nut and expanding portions of the head taken off, and Fig. 3, an end view of Fig. 2.

*b, b*, are the two parts of the expanding collar, which, with the wedges *a, a*, form the head of the bolt. The two parts *b, b*, form a centrally divided hollow cylinder and when close together as shown in Fig. 1, they fit so as just to work freely over the bolt. They are both cut away beveling on opposite sides as shown in Figs. 1 and 4, to fit to the wedges *a, a*.

It will be seen that the wedges *a, a*, extend up the sides of the bolt far enough to terminate in a point and thus allowing the head to be made much smaller give a greater length of bearing to the expanding pieces *b, b*, than if the bolt were formed with a head having inclined sides as might be the case. A groove is formed around the expanding pieces to receive a split ring *c*, of steel. The use of this ring is to confine the parts of the collar together and to the bolt so that they may be readily placed in the holes and when therein to allow them to expand as shown in the outside view, Fig. 4, and section Fig. 5. It also, when the nut is unscrewed and the collar loosened contracts the collar and allows the bolt to be removed. Without the last named property of the ring the bolts would be difficult to remove. The application of the ring *c*, is illustrated in Fig. 6, which is a section in the line *x, x*, of Fig. 1.

B, is the nut which is of the common kind. The expanding collar must always be of proper size to fit the opening which is to receive it, and when the bolt is to be employed the collar must be put on. We will suppose the bracket C, shown in Fig. 7, requires to be secured to a wall or piece of masonry, it has holes drilled or cast in it at distances apart to correspond with the holes in the wall or masonry but only of sufficient size to allow the screw part of the bolt to pass through.

The bolts with the expanding pieces drawn close together, as shown in Fig. 1, are placed with their heads in the holes in the masonry with their screw parts protruding therefrom, the nuts being removed. The bracket is held up to its place and then the nuts B, B, are put on the screws. The nuts when screwed up, draw on the bolt and as the wedges *a, a*, draw out they force apart the expanding pieces *b, b*, till they fit tightly within the holes. The harder the nut is screwed up the tighter will the bolt head fit the hole.

Instead of making the bolt with only two wedges *a, a*, as above described three or more may be used and the expanding collar may consist of a corresponding number of expanding pieces *b, b*, Fig. 8, exhibits an end view of a bolt with three wedges *a, a, a*, and Fig. 9 a section of the bolt and the expanding pieces.

Fig. 10, shows the manner in which we serrate the expanding pieces for making them hold in wooden work.

By making the nut in the form of a handle the expanding bolt may be converted into a lifting apparatus. This is illustrated in Fig. 12, where and in Fig. 11, the expanding head is shown of square form either to fit a square hole just large enough to receive it, or to be employed in a large irregular shaped hole with packing pieces.

In Fig. 12, D, represents a portion of a heavy iron casting having a cavity $d$, $d$, which happens to be convenient to receive the bolt head and two packing pieces $f$, $f$, which are placed between the expanding pieces $b$, $b$, and the opposite sides of the cavity $d$, $d$. By screwing the nut B', up against the contiguous shoulder of the expanding pieces of the bolt head, the bolt is drawn into the nut and the wedges $a$, $a$, force apart the expanding pieces and drive out the packing pieces till the bolt is secured perfectly tight.

In employing the bolt for lifting purposes however instead of constructing the nut to be taken hold of, we prefer to use a common nut B, as shown in Fig. 13, and to extend the bolt A, and furnish it with a ring E, or give its end some other form which will admit of its being taken hold of by a tackle. This is a safer arrangement as there is no danger of the slackening of the nut, by any twisting action during the lifting operation. Fig. 13, also serves to show that many articles requiring to be secured to the walls of buildings or other structures may be made to form part of the bolt.

Figs. 14 and 15, show the expanding principle applied to the nut instead of to the bolt. Fig. 14, is an end view of the nut E, having wedges $a$, $a$, on opposite sides, like the head of the bolts A, and having the expanding pieces $b$, $b$, applied to it, with a ring $c$, in the same manner as those bolts. The bolt employed in this case is a common screw bolt. Fig. 15, illustrates the application of this expanding nut with a bolt F, to secure an iron G, to a wall. The nut is inserted in a hole made in the wall to receive it, and by screwing up the bolt the nut is drawn up and its wedges force apart the expanding pieces $b$, $b$, till they fit tightly in the hole.

In all the above applications, the expanding bolt or nut is loosened when its nut or bolt is unscrewed, and by a slight tap on the end of the bolt the wedges $a$, $a$, may be driven inward to set the expanding pieces free, to be contracted by the elastic ring but Fig. 16, shows the manner in which a nut can be permanently fixed in a hole so as to admit of the insertion and removal of a screw-bolt without in any way disturbing it.

$A^2$, is a bolt with an expanding head $a$, $a$, $b$, $b$, $c$, just like Fig. 1, but having a nut $B^2$, which is cylindrical externally and not of greater diameter than the bolt head is when not expanded. The nut $B^2$, is about twice as deep as the greatest length of the screw $A^2$, it will ever receive. It has a notch $h$, cut in its outer end as shown in Fig. 17, to receive a screw driver. The hole in which the nut is received is as deep or a little deeper than the whole of the head of the bolt $A^2$, and the nut $B^2$, together. The bolt and nut are placed together entirely within the hole and the nut turned by a screw-driver, till the bolt head is sufficiently expanded. This leaves the nut jammed hard against the front shoulder of the expanding pieces $b$, $b$, and entirely within or flush with the face of the wall or other structure with a sufficient length unoccupied by the screw $A^2$, to receive another screw. A hook J, is shown screwed into this nut.

Fig. 18, shows a permanent nut $B^3$, applied like $B^2$, but protruding beyond the hole. For some purposes this protrusion of the nut may be desirable, as for instance, in securing a stone cornice or console when the nuts entering holes drilled for them in the back of the cornice or console serve to steady it while the screws $A^3$, which secure the cornice or console are put in.

What we claim as our invention and desire to secure by Letters Patent, is,

1. Constructing the head of a screw bolt of fixed wedges or inclined pieces $a$, $a$, and loose expanding pieces $b$, $b$, whereby the act of screwing up the nut is caused to expand the said head for the purpose of making it fit tightly in a suitable cavity or hole in which it is placed substantially as herein described, or what is equivalent constructing the nut with the said fixed wedges or inclined pieces and expanding side pieces so that by screwing in the bolt it may in the same manner be expanded to fit tightly within a suitable cavity.

2. Forming the fixed wedges $a$, $a$, or inclined side pieces of the bolt or nut up the sides of the bolt, as illustrated in Figs. 1, and 2, and herein described, so as to get a great length of bearing for the expanding pieces with a small sized bolt head or nut.

3. Confining the expanding pieces $b$, $b$, to the bolt or nut by means of an elastic ring $c$, substantially as described, which keeps them always in condition to use on the bolt or nut and which allows them to expand and to remain parallel during their expansion and contracts the collar when the nut or bolt is unscrewed and allows the bolt or nut to be removed.

JOHN LOUDON.
OTTO AHLSTRÖM.

Witnesses:
I. G. MASON,
WM. TUSCH.